(12) United States Patent
Hohm et al.

(10) Patent No.: US 9,162,682 B2
(45) Date of Patent: Oct. 20, 2015

(54) METHOD AND DEVICE FOR DETERMINING THE SPEED AND/OR POSITION OF A VEHICLE

(71) Applicants: Andree Hohm, Obernburg (DE); Matthias Komar, Frankfurt am Main (DE); Ulrich Stählin, Eschborn (DE)

(72) Inventors: Andree Hohm, Obernburg (DE); Matthias Komar, Frankfurt am Main (DE); Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/380,761

(22) PCT Filed: Feb. 26, 2013

(86) PCT No.: PCT/EP2013/053760
§ 371 (c)(1),
(2) Date: Aug. 25, 2014

(87) PCT Pub. No.: WO2013/127757
PCT Pub. Date: Sep. 6, 2013

(65) Prior Publication Data
US 2015/0025786 A1    Jan. 22, 2015

(30) Foreign Application Priority Data
Feb. 28, 2012   (DE) .......................... 10 2012 203 037

(51) Int. Cl.
*G06F 17/00*        (2006.01)
*B60W 40/105*       (2012.01)

(52) U.S. Cl.
CPC ............. *B60W 40/105* (2013.01); *G06F 17/00* (2013.01); *B60W 2420/42* (2013.01); *B60W 2420/52* (2013.01); *B60W 2420/54* (2013.01); *B60W 2550/40* (2013.01)

(58) Field of Classification Search
None
See application file for complete search history.

(56) References Cited

U.S. PATENT DOCUMENTS

| | | | |
|---|---|---|---|
| 8,140,214 B2 | 3/2012 | Krökel et al. | |
| 8,935,072 B2* | 1/2015 | Eisele | 701/93 |
| 2006/0020389 A1 | 1/2006 | Yamamoto | |
| 2010/0017128 A1 | 1/2010 | Zeng | |
| 2013/0124061 A1* | 5/2013 | Khanafer et al. | 701/70 |
| 2015/0005993 A1* | 1/2015 | Breuing | 701/19 |

FOREIGN PATENT DOCUMENTS

| | | |
|---|---|---|
| DE | 100 28 130 A1 | 12/2000 |
| DE | 102008008385 A1 | 8/2009 |
| DE | 10 2008 020 728 A1 | 10/2009 |
| DE | 10 2008 026274 A1 | 12/2009 |
| DE | 10 2010 007262 A1 | 8/2011 |
| JP | 2006 163615 A1 | 6/2006 |
| WO | WO 2006063546 A1 | 6/2006 |

\* cited by examiner

*Primary Examiner* — Redhwan k Mawari
*Assistant Examiner* — Edward Torchinsky
(74) *Attorney, Agent, or Firm* — Cozen O'Connor

(57) ABSTRACT

A method for determining the speed of a vehicle equipped with at least one surround sensor that determines environment data of the vehicle relative to at least one motionless object includes: receiving, by the vehicle, through wireless vehicle-to-environment communication with the at least one motionless object, a transmitted piece of information about the motionlessness of the motionless object; determining the relative motion of the vehicle with respect to the motionless object from the environment data of the vehicle relative to the motionless object; and determining the speed of the vehicle and/or the relative position of the vehicle with respect to the motionless object from the determined relative motion.

9 Claims, 2 Drawing Sheets

METHOD AND DEVICE FOR DETERMINING THE SPEED AND/OR POSITION OF A VEHICLE

CROSS-REFERENCE TO RELATED APPLICATIONS

This is a U.S. national stage of application No. PCT/EP2013/053760, filed on 26 Feb. 2013, which claims priority to the German Application No. DE 102012203037.9 filed 28 Feb. 2012, the content of both incorporated herein by reference.

BACKGROUND OF THE INVENTION

1. Field of the Invention

The invention relates to a method for determining the speed of a vehicle equipped with at least one surround sensor that determines environment data of the vehicle relative to at least one motionless object, and to a device for carrying out this method.

Surround sensors shall be understood to mean detection devices that use measurements to detect and map a vehicle's surroundings. The environment data output by the surround sensor describes objects detected by the measurements relative to the driver's vehicle. Thus, the environment data contains in particular a piece of information about a relative distance between the vehicle and the detected object, if applicable also in the form of a directional relative distance referred to a preferred direction defined by the vehicle. The environment data derived from the measurements can also be the relative distance to the vehicle, the radial velocity and the angle between the vehicle and the motionless object or other parameters that are derived from the measurements and characterize the location of the object relative to the vehicle.

2. Related Art

In order to determine the speed of the driver's vehicle, it is already known to estimate the instantaneous speed from measurements made by vehicle dynamics sensors in the vehicle. The sensors used in such solutions measure, for example, the wheel speed, yaw rate, transverse acceleration, steering acceleration or the steering-wheel angle, and work autonomously. Alternatively, the speed of the vehicle can also be determined from position data that has been determined using a preferably satellite-based navigation system such as Galileo, Glonass or GPS.

It is also known to use suitable sensors to monitor the surroundings of a vehicle. US 2010/0017128 A1 proposes a system for estimating vehicle dynamics. In this system, surround sensors provided in the vehicle for this purpose, such as radar, lidar or camera sensors, detect a stationary object in the vehicle surroundings and track the motion thereof. The speed and position of the vehicle are then estimated from this data, where vehicle motion sensors such as acceleration sensors or wheel speed sensors can also be used. The position and speed of the vehicle, however, can be estimated only relative to the stationary object currently under consideration.

WO 2006/063546 A1 describes a method and device for determining the vehicle speed from at least two images that have been recorded successively in time by a camera of the vehicle. The change in the position and/or the size of an object contained in the images is analyzed in this process. The speed of the vehicle in relation to the object is determined therefrom. The object may be a part of a road marking, for instance.

US 2006/0020389 A1 describes a system for generating digital lane markers in order to display the lane of a vehicle which comprises a camera, a GPS coordinate receiver and a gyro sensor. This data is combined in order to establish the precise position of the vehicle on a traffic lane.

Owing to the fact that the position and/or speed of the vehicle is determined relative to the objects located in the vehicle surroundings and detected by sensors, the values obtained are known only relative to the vehicles and also contain errors. In addition, determining the values takes a relatively long time because it is necessary to track the objects and then analyze this tracking. In addition, satellite data for determining the position of the moving objects is often not available reliably, especially in built-up environments containing streets of high-rise buildings, with the result that determining in particular the position value is difficult and prone to major errors.

SUMMARY OF THE INVENTION

Hence an object of the invention is to estimate a position and/or speed of the driver's vehicle more simply and more reliably.

This object is achieved according to the invention by a method and correspondingly embodied device, as described herein.

To this end it is proposed that at least one motionless object and the vehicle participate in wireless vehicle-to-environment communication, and that at least the motionless object transmits a piece of information about its motionlessness. For instance, this information is speed data that is transmitted by the object as part of standardized vehicle-to-environment communication. Alternatively, the motion status can be determined from the transmitted type of the object. For example, if the object is a set of traffic lights, a road sign or a roadside unit, then inevitably the object is not moving. This information is received by the vehicle preferably via an antenna configured for vehicle-to-environment communication. Then, the relative motion of the vehicle with respect to the motionless object is determined from the previously detected environment data of the vehicle relating to the motionless object, and the speed of the vehicle is determined from this relative motion. Additionally or alternatively, the relative position of the vehicle with respect to the motionless object can also be determined.

The environment data, for example, is the relative distance, the radial velocity and the angle between the vehicle and the motionless object. In order to be able to determine the relative motion, i.e., the change in the position over time, measurements can be made at at least two different times. The angle information can be used to represent the motion in a relative coordinate system between the object and the vehicle. The relative motion, which has been measured at two different times, can be used to determine the difference between the position values even without explicit knowledge of the position values in a defined coordinate system. This difference combined with the time interval between the measurements yields the speed. The speed is then available as a magnitude and relative to the motionless object. Since it is known that the object is not moving, i.e., it is stationary, the magnitude of the speed measured relative to the object is equal to the absolute speed. If a plurality of values are detected, for example by a continuous measurement, the trajectory of the position over time can be determined. The speed at a particular point in time is obtained from a time derivative thereof. If, for example, dimensions of the detected object are known, for instance because they are contained in the information received via the wireless vehicle-to-environment communication or can be derived therefrom, the position of the vehicle relative to the object can also be estimated if applicable using triangulation methods. The accuracy of the estimate is improved both for the speed and for the position by it being known from the vehicle-to-environment communication as an additional piece of information about the object that it is a motionless object and hence estimation errors do not arise from a movement of the object. If a surround sensor enables a direct measurement of the relative speed, then the described derivation of the speed from distance information is not required. Examples of such sensors are radar sensors.

In a development of the idea according to the invention, it can be provided that the motionless object also transmits a piece of information about its position, which is received by the vehicle, and that the (absolute) position of the vehicle is determined from the environment data of the vehicle relating to the motionless object and from the information about the position of the motionless object.

The position information from the motionless object is transmitted in particular in an absolute coordinate system, for example by specifying the degree of longitude and degree of latitude. From this information, the relative position and bearing between the vehicle and the object, which position and bearing were determined from the environment data and exist, for example, as X and Y coordinates in a relative coordinate system, can be converted by a coordinate transformation into an absolute coordinate system as degrees of latitude and longitude. Since the motionless object is at rest, the position thereof is usually known more accurately than the position of a moving object. This is because of the nature of the measurement, for example positioning by a global navigation system exhibits a greater error when objects are moving. Moreover for a stationary object, a plurality of measured position values can be averaged. In addition, the position of a motionless object can also be known by other means, for instance by a very accurate measurement made during installation of the object such as a set of traffic lights, for instance.

Hence the method according to the invention splits the determination of the absolute position of a moving object in an absolute coordinate system into two parts. In the first part, the position of the vehicle is determined relative to an object at rest by a surround sensor working autonomously in the vehicle. In the second part, this relative position is placed in an absolute coordinate system. Since it is possible to determine the absolute position of an object at rest with greater accuracy than the position of a moving object, the present method enables the absolute position to be determined more accurately than was previously possible. In addition, the method is also less prone to errors because the absolute position only needs to be determined once. It is thereby possible to reduce errors arising, for instance, from the fact that using satellite navigation to determine the position requires an unobstructed line of sight to the satellite. This can be made more difficult in urban traffic because of the surrounding buildings or when the sky is cloudy, and therefore takes longer or results in inaccuracies.

In a development of this idea, a velocity (directional speed) of the vehicle is determined from the positions of the vehicle and of the motionless object and from the relative motion of the vehicle with respect to the motionless object. In this process, the velocity is defined by magnitude and direction in the coordinate system in which the positions of vehicle and object are known. In particular, the velocity can hence be represented as a vector in an absolute coordinate system.

In a preferred embodiment, the environment data of the vehicle is determined with respect to a plurality of motionless objects. In particular two motionless objects, but preferably between three and five to twenty motionless objects, are used for this purpose. In addition, all the motionless objects send a piece of information about their motionlessness, which is received by the vehicle. Then the relative motion of the vehicle with respect to the motionless objects is determined from the various environment data of the vehicle relating to the motionless objects, and the speed of the vehicle is determined from this relative motion.

The individual speeds obtained in this way are averaged to give a single speed value for the vehicle, wherein if applicable the different directions of movement are taken into account. The averaging can here be determined as an arithmetic mean or in the form of a weighted average.

If the average value is determined arithmetically from the individual measurements, then the averaging takes equal account of the individual measurements. As an alternative to this, the speed can be determined from the individual measurements weighted by a weighting factor. For instance, the weighting can be based on the distance between the object and the vehicle. The weighting factor is then chosen according to the accuracy with which the individual values have been measured by the surround sensors. For instance, some radar sensors measure the speed of an object in the far field more accurately than the speed of an object in the near field. It can hence be provided in this case that a distant object is incorporated in the averaging with a higher weighting factor than a close object. The speed of the vehicle is thereby determined with a significantly greater accuracy. In addition, this reduces the error susceptibility of the speed determination process, which can be produced, for instance, by a single erroneous measurement.

An embodiment developed therefrom optionally provides that the motionless objects transmit a piece of information about their position, which is received by the vehicle, and that the position of the vehicle is determined from the environment data of the vehicle relating to the motionless objects and from the information on the position of the motionless objects. According to the method described above, the position of the vehicle can thereby be obtained by averaging the individual values. A weighted average or an arithmetic mean can be used for the averaging.

For the weighted averaging, the accuracy with which the object has determined its position, and/or the dimensions of the object, can be taken into account in the weighting factor. This information can be transmitted in addition to the position information as part of the vehicle-to-environment communication. This makes it possible to give greater weight to objects that have smaller dimensions and/or a position that is known more accurately than to the other objects. This results in increased accuracy in particular in determining the position.

In a further development of this idea, the speed and/or the position of the vehicle can be determined using statistical methods. By suitable choice of the statistical method, for example, it is thereby possible for the speed and position to have a reduced error susceptibility. Examples of statistical methods here may be expected values, Kalman filters (using variations over time of the measurements), or the like.

In a further improved embodiment, the determined position and/or speed of the vehicle can be fused with position and speed values from in-vehicle sensors, in particular with the measurements of vehicle dynamics. Vehicle dynamics sensors that measure dynamic properties of the vehicle are, for instance, acceleration sensors or yaw rate sensors. The sensor fusion combines data from different sensor technologies, thereby improving the accuracy of the entire sensor system and position and/or speed estimate. Ideally, Kalman-filter based methods or particle filters or similar methods are used for this purpose.

In a further development it can also be provided that a radar sensor, a camera sensor, a laser scanner, a lidar and/or ultrasound sensors are used as the surround sensors. By using the radar sensor, for example, in a single measurement it is possible to measure the distance between the objects and the vehicle and, for a suitable angular resolution, likewise the angular relationship and the radial velocity, from which the relative speed can be determined directly. For this purpose, a radar signal is transmitted by the radar sensor and picked up again after reflection at the remote object. The transit time of the radar signal is determined therefrom and hence the distance between the object and the vehicle and the angle between the two. In addition, by analyzing the frequency of the radar signal before and after transmission, the Doppler shift of the radar signal can be determined in order to take into account the motion of the vehicle. The radial velocity between the vehicle and the object is obtained directly therefrom using known techniques, which therefore do not need to be explained further here.

When using a camera sensor as the surround sensor, at least two images are captured and the change in position of an object visible therein is determined using a suitable technique, for instance a triangulation technique. If the size of at least individual features of the object is known then a single recording is sufficient to determine the position. This supplies the relative speed and the angle between the vehicle and the object.

The invention also relates to a device for determining the speed and/or position of a vehicle, wherein the vehicle is equipped with a communications unit for participating in a wireless vehicle-to-environment communication, with at least one surround sensor, which determines environment data of the vehicle relating to at least one motionless object, and with a processing unit. The processing unit is designed to execute the method described above or parts thereof.

BRIEF DESCRIPTION OF THE DRAWINGS

Further advantages, features and possible uses of the present invention also appear in the following description of exemplary embodiments and in the drawings. All the features described and/or depicted therein form individually or in combination the subject matter of the present invention irrespective of how they are combined in the claims or the dependency references thereof. In the drawings:

DETAILED DESCRIPTION OF THE PRESENTLY PREFERRED EMBODIMENTS

Figure 1:
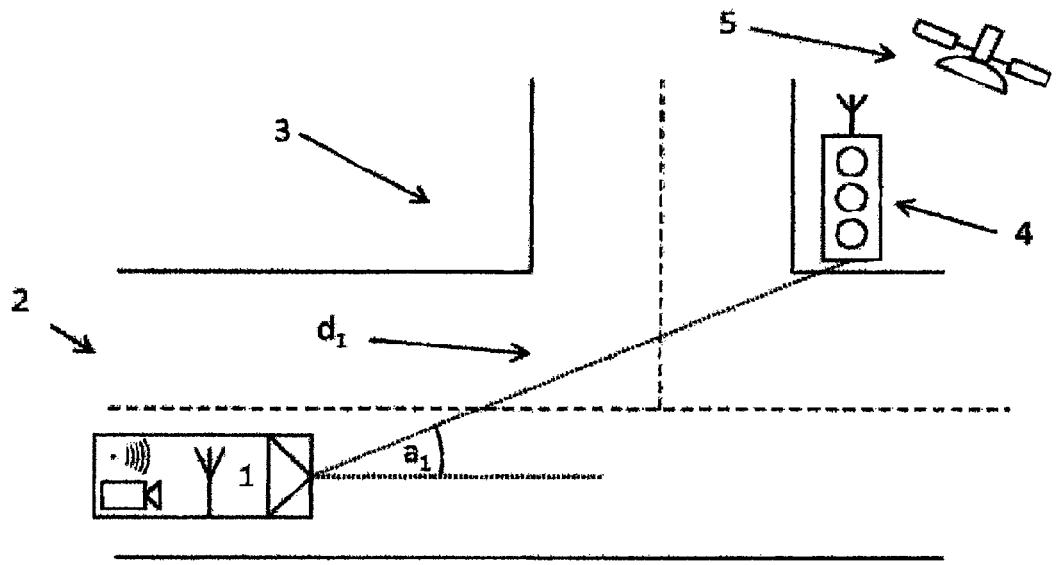
FIG. 1 shows schematically a traffic situation at a crossroads.

FIG. 1 shows a vehicle 1 located on a roadway 2. The vehicle 1 is moving towards a crossroads 3 at which a motionless object 4 is located. The motionless object 4 is a set of traffic lights arranged in a stationary manner on the opposite side of the crossroads 3 from the vehicle.

Both the vehicle 1 and the set of traffic lights 4 participate in the vehicle-to-environment communication. As part of the standardized vehicle-to-environment communication, the set of traffic lights 4 transmits messages. These messages contain the speed, position and dimensions of the set of traffic lights 4. Since the set of traffic lights 4 is a stationary object, the speed is equal to zero. The vehicle 1 receives these messages by its antenna. In the processing unit of the vehicle 1, this message is analyzed and it is established that a motionless object is in the surroundings.

Then the set of traffic lights 4 is detected by surround sensors of the vehicle 1. The surround sensors are a radar sensor and a camera sensor. The radar sensor, using a measurement that is resolved with respect to time, angle and frequency, detects the distance, the angle and the relative speed between the vehicle 1 and the set of traffic lights 4. The camera sensor also detects the set of traffic lights 4 in parallel with the detection of the set of traffic lights 4 by the radar sensor. The camera records images at at least two different times. The relative speed and the angle between the two objects can be determined from these images by techniques that are known in the prior art. In a subsequent sensor fusion, these values are combined into a single speed and position value. Hence the surround sensors supply the distance $d_1$, the angle $a_1$ and the speed between the vehicle 1 and the set of traffic lights 4.

This environment data can be represented in a relative coordinate system, the origin of which coincides, for example, with the position of the set of traffic lights. Therefore the set of traffic lights 4 has the coordinates (0,0) in the relative coordinate system. Alternatively, the coordinate system of the vehicle 1 is suitable as the relative coordinate system.

As part of the vehicle-to-environment communication, the vehicle 1 receives the position data from the set of traffic lights 4 in a global coordinate system, for example as degrees of latitude and longitude. The vehicle 1 likewise receives the dimensions of the set of traffic lights 4. The position information can be acquired in the set of traffic lights 4 by a satellite positioning system, which receives data from a satellite 5 for this purpose. Using the absolute position of the set of traffic lights 4, the relative coordinate system is transformed into the absolute (global) coordinate system by a simple coordinate transformation. The absolute speed and the driving direction are thereby determined. The speed is then available as a vector, i.e., as a velocity, in a known global coordinate system. The position information of the vehicle also exists in this coordinate system. In this case, the dimensions of the set of traffic lights 4 are interpreted as an error in the position detection.

Figure 2:
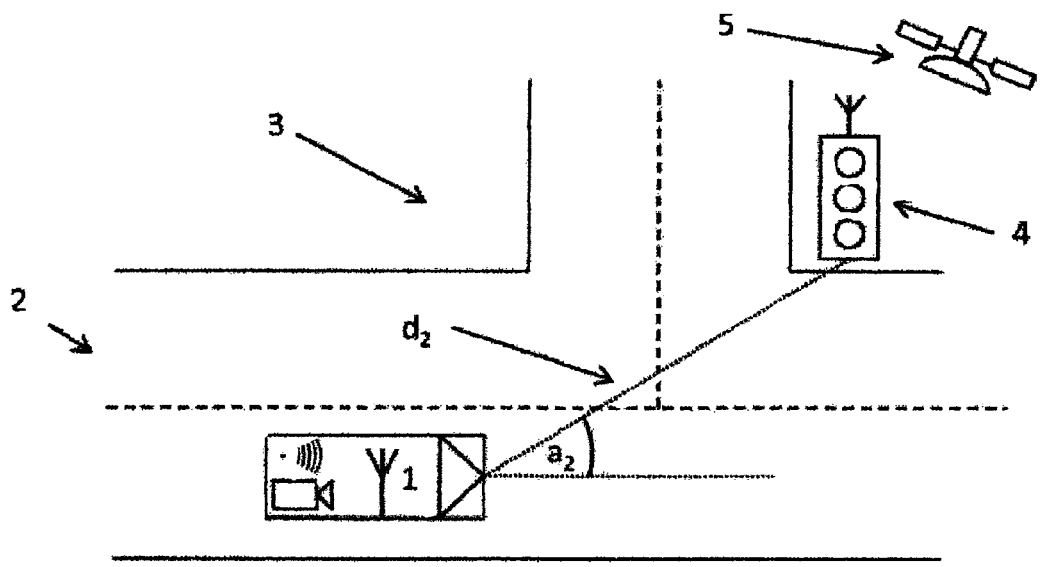
FIG. 2 shows the traffic situation of FIG. 1 at a later point in time.

FIG. 2 shows the situation of FIG. 1 at a later point in time. The vehicle 1 has already moved further forwards towards the crossroads 3 and hence also towards the set of traffic lights 4. The distance $d_2$ between the vehicle 1 and the set of traffic lights 4 has thereby decreased, while the angle $a_2$ between the object 4 and the driver's vehicle 1 has increased.

Figure 3:
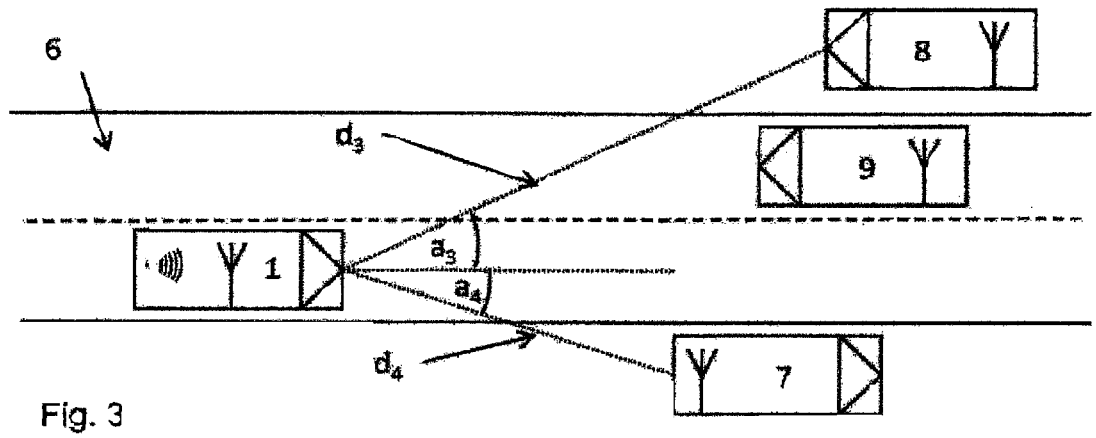
FIG. 3 shows schematically a different traffic situation on a straight roadway.

FIG. 3 shows the vehicle 1 on a straight two-lane roadway 6. At the roadsides of the roadway 6 are vehicles 7 and 8, which are each parked in the driving direction, i.e., are not moving. These may also be other objects such as traffic lights or roadside units as long as they are at rest and transmit their position as part of the vehicle-to-environment communication. The vehicle 9 is moving in the opposite direction to the vehicle 1 on an opposite lane of the roadway 6.

The vehicles 7, 8 and 9 transmit, for instance, DENM messages ("Decentralized Environmental Notification Messages") as part of the wireless vehicle-to-environment communication. These messages contain information about the position and speed of the objects 7, 8, 9 and are received and processed by the vehicle 1. In this process, an analysis device of an in-vehicle processing unit establishes that the vehicles 7 and 8 are at rest and that the vehicle 9 is moving.

The vehicles 7 and 8 are also identified and detected by the radar and camera sensors of the vehicle 1 that are working as surround sensors. The surround sensors determine the environment data between the vehicle 1 and the motionless vehicles 7, 8, i.e., their relative speed, distance $d_3$, $d_4$ and angle $a_3$, $a_4$ with respect to each other or the relative motion. Each item of this data is entered in a relative coordinate system as position values and direction values. The origin of the coordinate system is always chosen here such that the relevant motionless object lies at the origin. The vehicle 9 is not taken into account because it is not at rest.

On the basis of the information from the DENM message, a new value is assigned to the origin of the relative coordinate systems, namely the absolute position of the relevant vehicle 7, 8. The relative coordinate systems are hence transformed into an absolute coordinate system, whereby the bearing and position of the vehicle 1 are represented in absolute terms. This determination is performed independently for each motionless object. Hence two independent sets of speed and position values in an absolute coordinate system exist in the driver's vehicle 1. These sets are taken into account in a weighted average. The vehicle 7 lies in the near field of the radar sensor of the vehicle 1 whereas the vehicle 8 lies in the far field. Since the accuracy of the radar sensor is better in the far field, the value set that has been determined on the basis of the vehicle 8 is given a higher weighting in the averaging process.

In a variant of this exemplary embodiment according to FIG. 3, the vehicle 1 only takes into account the parking vehicle 7 in order to calculate the speed and position. This is advantageous because the vehicle 8 lies on the roadside opposite the traffic lane of the vehicle 1 and may be screened by the passing traffic, which is symbolized by the vehicle 9.

If screening occurs, a measurement using the surroundings sensors would contain considerable errors or not be possible at all.

Figure 4:
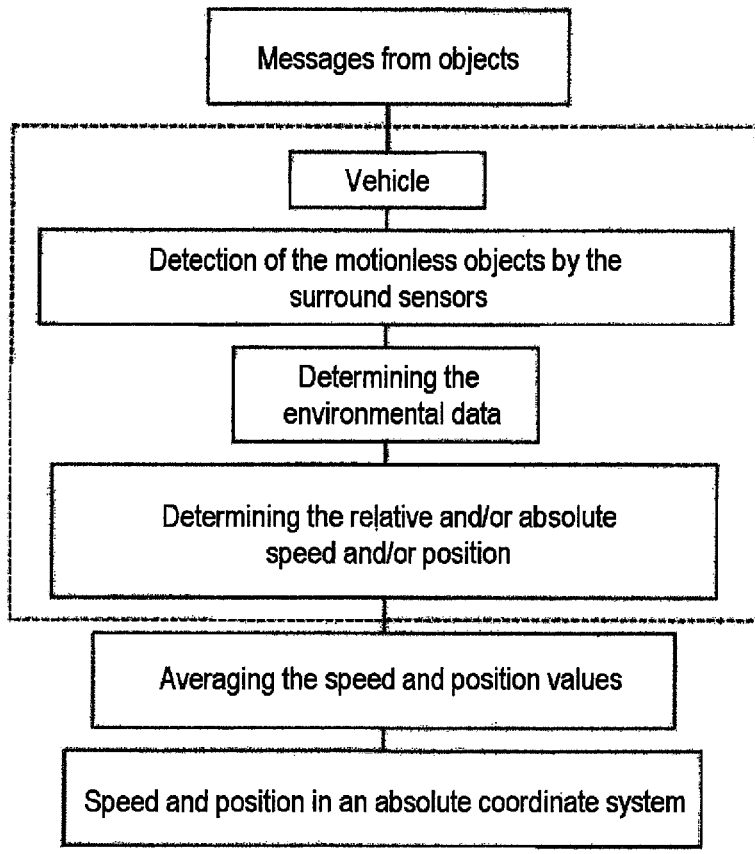
FIG. 4 shows a flow diagram for an exemplary embodiment of the method according to the invention.

The method described above is summarized again below with reference to FIG. 4. As part of the method, which can be executed by a suitably designed processing unit, for example, messages received from the objects 4, 7, 8 and 9 are hence analyzed by the vehicle 1. After the information contained therein is analyzed and it is established that the objects 4, 7 and 8 are not moving, the surrounding sensors detect these objects 4, 7, 8. The environment data therefrom are hence determined. The position and speed relative to the motionless object are determined from the environment data by suitable calculation according to methods known per se. The absolute speed and position of the vehicle can be determined therefrom together with the information from the message from the motionless object 4, 7, 8.

If messages from a plurality of objects 4, 7, 8 exist, the above method steps are each repeated for each object 4, 7, 8. The set or possibly sets of position and speed values obtained in this way are averaged or combined in a subsequent step. In this step, various statistical methods for averaging can be applied according to the situation.

This yields the velocity given by magnitude and direction, and the position, in an absolute coordinate system.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for determining the speed of a vehicle (1) equipped with at least one surround sensor that determines environment data of the vehicle (1) relative to at least one motionless object (4, 7, 8), the method comprising:
   receiving, by the vehicle (1), through wireless vehicle-to-environment communication with the at least one motionless object (4, 7, 8), a transmitted piece of information about the motionlessness of the motionless object (4, 7, 8);
   determining the relative motion of the vehicle (1) with respect to the motionless object (4, 7, 8) from the environment data of the vehicle (1) relative to the motionless object (4, 7, 8); and
   determining the speed of the vehicle (1) and/or the relative position of the vehicle (1) with respect to the motionless object (4, 7, 8) from the determined relative motion.

2. The method as claimed in claim 1, further comprising:
   receiving, by the vehicle (1), from the motionless object (4, 7, 8), a transmitted piece of information about the position of the motionless object (4, 7, 8); and
   determining the position of the vehicle (1) from the environment data of the vehicle (1) relating to the motionless object (4, 7, 8) and from the information about the position of the motionless object (4, 7, 8).

3. The method as claimed in claim 2, further comprising:
   determining a velocity of the vehicle (1) from the positions of the vehicle (1) and of the motionless object (4, 7, 8) and from the relative motion of the vehicle (1) with respect to the motionless object (4, 7, 8).

4. The method as claimed in claim 1, further comprising:
   determining the environment data of the vehicle (1) with respect to a plurality of motionless objects (4, 7, 8) by:
     the vehicle (1) receiving, from the motionless objects (4, 7, 8), a transmitted piece of information about the motionlessness of the motionless objects (4, 7, 8),
     determining the relative motion of the vehicle (1) with respect to the motionless objects (4, 7, 8) from the various environment data of the vehicle (1) relating to the motionless objects, and
     determining the speed of the vehicle (1) from the determined relative motion.

5. The method as claimed in claim 4, further comprising:
   the vehicle (1) receiving, from the motionless objects (4, 7, 8), a transmitted piece of information about the position of the motionless objects (4, 7, 8); and
   determining the position of the vehicle from the environment data of the vehicle relating to the motionless objects (4, 7, 8) and from the information on the position of the motionless objects.

6. The method as claimed in claim 5, wherein
   the speed and/or position of the vehicle (1) is determined using statistical methods.

7. The method as claimed in claim 5, further comprising:
   fusing the determined position and/or speed of the vehicle (1) with position and speed values from in-vehicle sensors.

8. The method as claimed in claim 1, wherein the surround sensor comprises at least one of a radar sensor, a camera sensor, a laser scanner, a lidar and/or ultrasound sensors.

9. A device in a vehicle (1) for determining the speed and/or position of the vehicle (1), wherein the device comprises:
- a communications unit configured to participate in a wireless vehicle-to-environment communication;
- at least one surround sensor configured to determine environment data of the vehicle (1) relating to at least one motionless object (4, 7, 8); and
- a processing unit configured to execute the method as claimed in claim 1.

* * * * *